July 30, 1935.　　W. F. WESTENDORP　　2,009,826
LIGHT MODULATION SYSTEM
Filed Feb. 28, 1931　　2 Sheets—Sheet 2
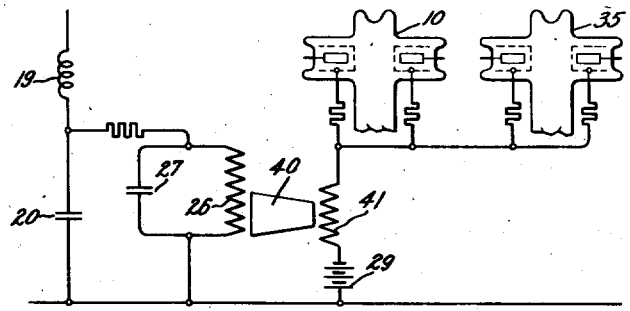
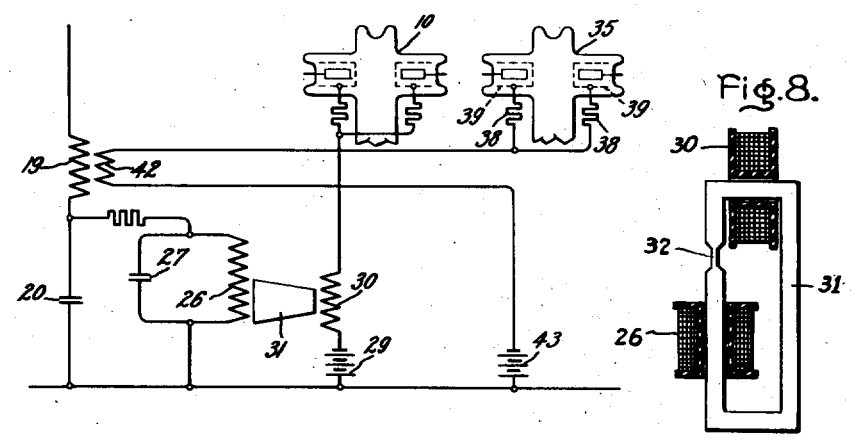
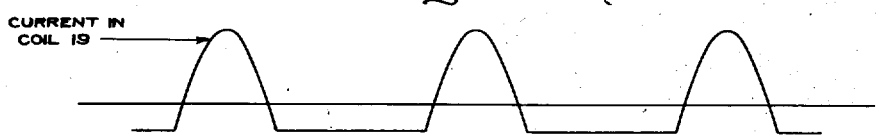
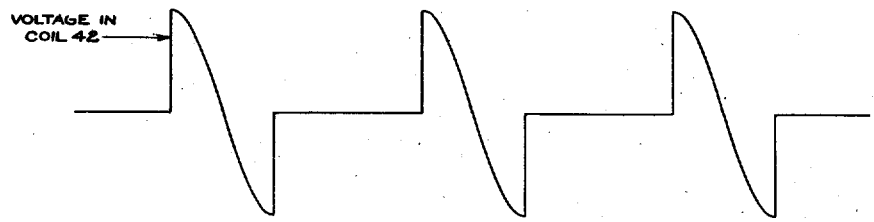
Inventor:
Willem F. Westendorp,
by Charles V. Tullar
His Attorney.

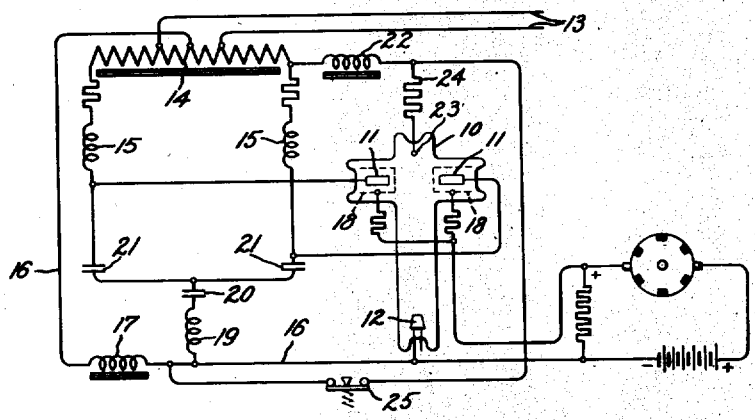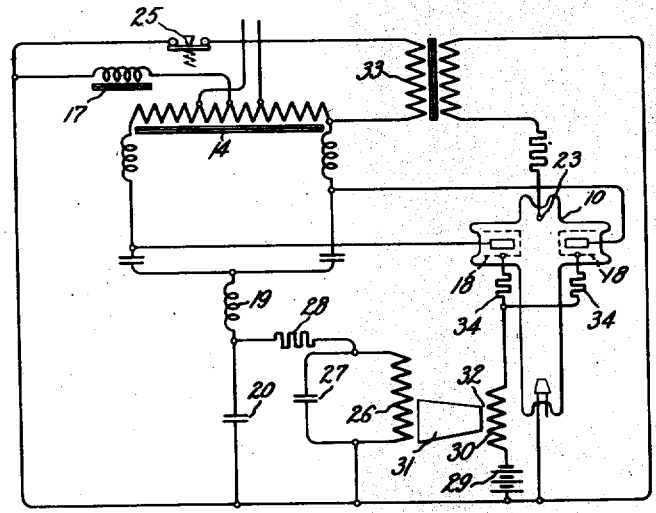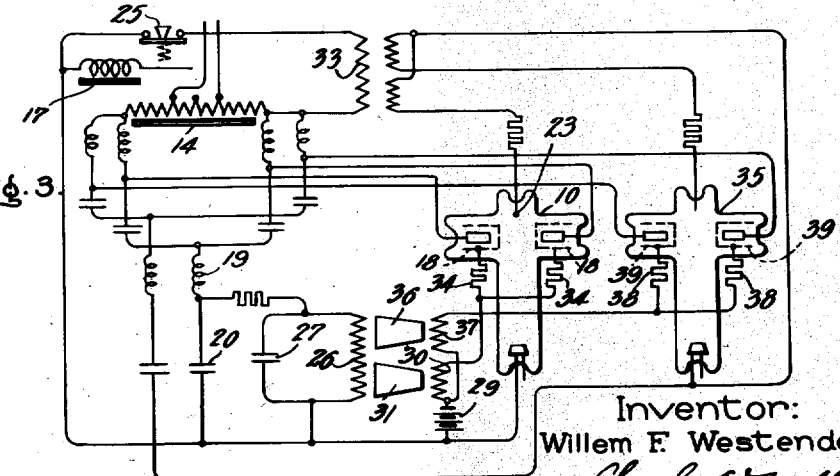

Patented July 30, 1935

2,009,826

UNITED STATES PATENT OFFICE 2,009,826

LIGHT MODULATION SYSTEM

Willem F. Westendorp, Schenectady, N. Y., assignor to General Electric Company, a corporation of New York Application February 28, 1931, Serial No. 519,201

21 Claims. (Cl. 176—124)

This invention relates to light systems in which light is periodically varied at a high frequency, particularly to the modulation of light by electrical means, and has for its principal object the provision of an improved and simplified light modulation system of this character.

Various systems, both mechanical and electrical, have been proposed in the past for causing the emission of light from a lamp device to occur at rapidly recurring intervals or for varying periodically the intensity of the light. In such systems the light is modulated at a definite predetermined frequency, for example, 1000 cycles per second, such modulated light being capable of important applications to direction finding or other like uses, as for the guiding of aircraft to a landing field and the safe landing of the aircraft thereon during fog conditions.

Mechanical systems for the modulation of light have been found objectionable because of difficulties due to the use in such systems of rapidly rotating commutator or shutter mechanisms, or other mechanical complications. In order to avoid these and other difficulties inherent in mechanical systems of light modulation and to produce modulated light by purely electrical means in a system supplied from a usual commercial electric lighting source, it has been proposed to provide a system comprising a rectifier for the conversion of the usual sixty cycle or other low frequency alternating current from a lighting source into direct current, an inverter for the conversion of this direct current into alternating or interrupted current of a predetermined relatively high fequency, for example, 1000 to 3000 cycles per second, and a lamp, supplied by this high frequency current, from which the modulated light is emitted.

The above proposed electrical system of light modulation while obviating certain difficulties encountered in mechanical systems, is, however, open to the objection that the functions of current rectification, of current inversion, and of light emission are performed by separate elements, such as mercury arc or other space charge devices, with consequent undue complication of apparatus and high cost of construction and operation.

In accordance with my invention these difficulties are overcome by the provision of a light modulation system whereby certain structural elements are eliminated in the above-described energy-conversion sequence beginning with the input of 60 cycle alternating current and continuing, through the rectifier, the inverter, and the lamp, to the output of modulated light. To effect the desired simplification of this apparatus, in accordance with my invention, I have provided a light modulation system, supplied from a commercial alternating current source, wherein one space discharge device, preferably a neon lamp, serves simultaneously as rectifier, inverter, and light source.

My invention will be better understood from the following description when considered in connection with the accompanying drawings and its scope will be pointed out in the appended claims.

Referring to the drawings, Fig. 1 is a diagrammatic illustration of a light modulation system embodying my invention and comprising a single electric vapor lamp; Fig. 2 illustrates a modification of the invention shown in Fig. 1; Figs. 3, 4 and 5 illustrate modifications of the invention similar to that shown in Fig. 2, but comprising a plurality of lamps operating in parallel; Figs. 6 and 7 are respectively current and voltage curves illustrating the operation of the embodiment of the invention shown in Fig. 5, and Fig. 8 is a detail view of the permalloy member and the coils associated therewith, shown diagrammatically in Fig. 2 for example.

In the embodiment of my invention shown in Fig. 1, an electric vapor lamp 10, preferably of the neon type, comprising two anodes 11 and a cathode 12, is arranged for operation from a usual 60 cycle alternating current source 13. Alternating potentials are impressed upon the anodes 11 by means of a transformer 14 which is connected to the anodes through choke coils 15 and which is supplied with current from the alternating current source 13. The direct-current anode-cathode circuit comprising the transformer 14, anodes 11, and cathode 12 is completed through a lead 16 connected to the neutral point of transformer winding 14 and in which is connected a choke coil 17.

In order to control the starting of current flow at the anodes 11 for reasons which will be explained hereinafter, the anodes are provided with control electrodes or grids 18 which are connected to a suitable source of variable voltage so arranged that while the grids are normally negative they become periodically positive at a predetermined frequency, for example, 1000 times per second.

The variable voltage source may be constituted by a direct current source including, for example, a battery system and commutator so arranged that as the commutator rotates the battery system supplies negative voltage to the grids during relatively long time periods, these long time periods being separated by relatively short periods during which the battery system supplies a positive voltage. Each of these positive periods of the grids, which recur 1000 times per second, should be of very short duration compared to $\frac{1}{1000}$ second.

To cause the rectified current in the lamp 10 to be modulated at the above predetermined frequency of 1000 cycles per second in a manner to be more fully explained hereinafter, a second anode-cathode circuit is provided in addition to the above-described direct-current circuit, this second circuit comprising the anodes 11, cathode 12, and an inductance 19 and capacitor 20 to tune this second anode-cathode circuit to an oscillation frequency which is higher to a predetermined degree than that of the periodic positive potential impressed on the grids. The above-described second anode-cathode circuit should be tuned to a frequency which is at least three times the frequency of the periodic grid potential. In order to separate the anode-cathode oscillation circuit, comprising inductance 19 and capacitor 20, from the direct-current anode-cathode circuit comprising the transformer winding 14 and the choke 17, the anodes 11 are connected to this oscillation circuit through blocking condensers 21 each in series with a different one of the anodes.

The lamp 10 is provided with a starting circuit including the transformer 14, a choke coil 22 connected between the transformer and the starting anode 23 through a resistor 24, the choke coil 17, and a kickswitch 25 connected between these choke coils and in shunt with the starting anode 23 and the cathode 12. At break of the current through the switch 25, a high starting voltage is impressed upon the starting anode 23 through the resistor 24.

It will be readily understood that the transformer 14, choke coil 17, anode chokes 15, and lamp 10 including anodes 11 and cathode 12 may be considered as forming parts of a normal alternating current neon lamp system providing unmodulated light, and that in normal operation of this system a direct current would be obtained, flowing through the choke 17 and having approximately only a 10% pulsation. It will be observed, however, that the system in accordance with my invention differs from that of the assumed normal neon lamp system above described, first, by the provision of the control electrodes or grids 18 associated with the anodes 11, and, second, by the provision of the anode-cathode oscillation circuit comprising the tuning elements, inductance 19 and capacitor 20.

In operation of the complete system shown in Fig. 1, the grids 18 are normally sufficiently negative to prevent the starting of the anode current, but become positive 1000 times per second. Although each period during which the grids are positive is of very short duration, this period of positive grid potential is sufficient to start the anode current of that one of the anodes 11 which happens to be positive at the moment the grids become positive. The starting of the anode current starts in turn an oscillatory discharge in the oscillation circuit comprising the cathode 12, inductance 19, capacitor 20 and anodes 11. Since, however, current can flow in only one direction in the tube 10 by reason of the rectifying action of the tube, the current in the oscillation circuit flows during only one-half cycle of the oscillation, or for $$\pi\sqrt{LC}$$

second, L and C representing respectively the values of the inductance 19 and capacitance 20.

After the current in the oscillation circuit stops at the end of the positive half cycle, the condenser 20 is charged by the discharge of direct current through the choke coil 17 and the oscillation circuit is then in condition for the next half cycle of oscillatory discharge, which occurs $\frac{1}{1000}$ second later when the grids again become positive. The above-described action continues with the result that the light emitted by the lamp 10 is modulated at that frequency 1000 cycles per second, at which the oscillator discharges in the oscillation circuit are initiated by the action of the periodically positive grid potential.

At every half cycle of the anode voltage, or every $\frac{1}{120}$ second in case the supply voltage from current source 13 is 60 cycle, the anode current passes from one of the anodes 11 to the other but without interference with the above-described operation of the oscillation circuit, since the blocking condensers 21 are large compared with the tuning capacitor 20 and provide a path to both anodes for the oscillations. The chokes 1 in the leads connecting the anodes and the transformer 14 ensure a smooth passing over of the current from one anode to the other by causing overlap of the anode currents in the usual manner, whereby, for a short time during the 60 cycle period, both anodes 11 carry in parallel the pulsating high frequency current produced as above described.

In order to obtain a deep modulation of the light emitted by lamp 10, it is necessary that the duration of the flash, or half oscillation, persisting in the oscillation circuit during the time $$\pi\sqrt{LC}$$

second be made small compared to the time elapsing between the successive periods of positive grid potential which in the present case are timed 1/1000 second apart. Further, the time during which the grids remain positive at each of their periods of positive potential must be made smaller than the time, $$\pi\sqrt{LC}$$

second, of the half oscillation in the oscillation circuit in order to ensure that a grid has regained control of the discharge in the tube when the corresponding anode again becomes positive.

It will be seen that in the light modulation system hereinbefore described substantially all of the electrical energy supplied from current source 13 to the vapor electric device 10, which is included in the rectifying means and the modulation means and which in addition operates as highly efficient lamp, is converted into radiant energy in this device 10, the relatively large amount of light emitted by the lamp being modulated at a predetermined frequency, e. g., 1000 cycles per second, for reception by suitably tuned light sensitive apparatus.

The modification of my invention shown in Fig. 2 is similar in structure and mode of operation to the embodiment of the invention shown in Fig. 1, except that in Fig. 1, the periodically positive potential impressed upon the grids 18 is derived from an outside voltage source, whereas in the system of Fig. 2 means are provided within he system itself for producing this grid voltage. In Fig. 2, these means comprise a circuit, tuned to the frequency of 1000 cycles per second, including an inductance 26 and a capacitor 27 and coupled through a resistor 28 to the oscillation circuit hereinbefore described as including the tuning elements, capacitor 20 and inductance 19. A grid circuit is provided including the grids 18 in parallel, a negative grid bias source 29, and a coil 30 between which and the inductance 26 extends a flux coupling member 31 having high permeability, such, for example, as a permalloy strip, and having a narrow flux-conducting portion 32. This flux-conducting member is preferably formed of permalloy. A starting circuit for the system includes the transformer 14, choke coil 17, kickswitch 25 and transformer 33.

In operation of the system shown in Fig. 2, at break of current in the starting circuit a high voltage is produced in the secondary of transformer 33 and impressed upon the starting anode 23 of the lamp 10. This starting operation starts in turn an oscillatory discharge in the oscillation circuit comprising the inductance 19 and capacitor 20. Oscillations are thereupon impressed upon the tuned circuit including inductance 26 and capacitor 27, the current in this circuit tending to oscillate at the 1000 cycles per second frequency to which it is tuned. An alternating voltage of this frequency is therefore induced in the coil 30 which is coupled to inductance 26 of the 1000 cycle tuned circuit through the permalloy strip 31 and this alternating voltage is impressed upon the grids 18 through resistors 34, the magnitude of the positive half waves of this voltage being sufficient periodically to neutralize the negative grid bias from source 29 and to produce positive potentials on the grids. Since the permalloy strip 31 is arranged to saturate in the narrow portion 32, the voltage induced in coil 30 and impressed upon the grids 18 will have a very pointed wave shape which is desirable for accurate control of the current in the anode-cathode oscillation circuit by the grid potential.

As soon as the control of the discharge by the grids is fully established the 1000 cycle operation of the lamp 10, as described in connection with the form of the invention shown in Fig. 1, becomes stable. The voltage across the capacitor 20 of the oscillation circuit contains a strong component of fundamental frequency and supplies an amount of energy to the 1000 cycle tuned circuit comprising capacitor 27 and inductance 26 sufficient to saturate the permalloy member 31 as described and to sustain the series of voltage impulses to the grids 18.

In Fig. 3 is shown a parallel arrangement of lamp 10 and other similar lamps, as lamp 35. In order to operate a plurality of such lamps, having the light emitted therefrom modulated in accordance with my invention, in synchronism and in phase, it is necessary that all the lamps be supplied with the same grid voltage. In the system shown in Fig. 3, this is accomplished by constituting tube 10 a monitor or controlling unit.

It will be understood that the circuit connections of tube 10 in Fig. 3 are the same as those shown for this tube in the embodiment of the invention shown in Fig. 2, the grid voltage being supplied from the tuned circuit 26, 27 through the permalloy member 31, grid circuit coil 30 and grid resistors 34, the grid circuit comprising further the negative grid bias source 29. One power transformer may supply the anodes of both lamps 10 and 35 with voltage from the 60 cycle alternating source 13, or lamp 35 may be provided with a separate power transformer. The grid voltage for lamp 35, however, is obtained from the tuned circuit 26, 27 of the monitor lamp 10 through a second permalloy member 36, similar to permalloy member 31 of lamp 10, which couples the inductance 26 to a coil 37 in the grid circuit of lamp 35, alternating voltages in synchronism and in phase with the voltages impressed on grids 18 of lamp 10 being thereby impressed through resistors 38 on the grids 39 of lamp 35. Since the grid voltages in the paralleled lamps are thus identical, the modulation action hereinbefore described in connection with the system shown in Fig. 2 will occur simultaneously in the plurality of lamps and the light emitted from all the lamps will have the same modulation characteristics.

The parallel system shown in Fig. 4 is similar in circuit arrangements and operation to that shown in Fig. 3 and above described, the tube 10, provided with tuned circuit 26, 27, constituting the monitor or controlling unit which determines the frequency of the grid voltages of the other paralleled units, such as lamp 35. The system shown in Fig. 4 differs from that shown in Fig. 3 only in that a single permalloy member 40, similar to the permalloy members 31 and 36 hereinbefore described and functioning in the same manner, is employed to couple the inductance 26 of the tuned circuit 26, 27 to the grid circuits of the lamps, the voltage from the tuned circuit being impressed upon all of the grids in parallel through preferably a single grid circuit coil 41.

The parallel system shown in Fig. 5 is likewise similar to that shown in Fig. 3 in that the tube 10, provided with the oscillation circuit including inductance 19 and capacitor 20, and provided with the tuned circuit 26, 27, constitutes the monitor or controlling unit for the other lamps which are in parallel with lamp 10. In the system of Fig. 5, however, the grids 39 of a lamp, as 35, paralleled with lamp 10 are not supplied from the tuned circuit 26, 27 but from the anode-cathode oscillation circuit hereinbefore described in connection with Figs. 1 and 2 and including the inductance 19 and capacitor 20. The grid circuit of a lamp, as 35, in parallel with lamp 10 is completed through a coil 42 which is similar to or identical with grid circuit coil 30 of Figs. 2 and 3 but which is coupled to the inductance coil 19 of the above-described anode-cathode oscillation circuit of lamp 10. A suitable source of negative grid bias, as the source 43, is included in the grid circuit of lamp 35. An alternating or oscillating current having a wave shape shown in Fig. 6 flows in the inductance coil 19 and a voltage is induced in the grid circuit coil 42 having the wave shape shown in Fig. 7, this voltage being impressed upon the grids 39 of lamp 35 through the resistors 38.

Since the induced grid voltage, as represented in Fig. 7, rises instantaneously to a high value the oscillatory discharges in lamp 35 will start at exactly the same instant as those of the monitor lamp 10. The coupling of the grid circuit coils, corresponding to lamps parallel with the monitor lamp 10, to the inductance 19 of the anode-cathode-oscillation circuit instead of to the inductance 26 of the tuned circuit 26, 27 offers the advantages that no permalloy is required to couple the grids of these added lamps to the monitor lamp circuits, a large amount of energy is available in the oscillation circuit including the inductance 19, and no appreciable reaction on the circuits of the monitor lamp 10 occurs.

What I claim as new and desire to secure by Letters Patent of the United States, is,—

1. In a light modulation system comprising an alternating current source, an electric vapor lamp including a cathode and a plurality of anodes, a direct-current anode-cathode circuit, and means included in said circuit to impress alternating voltages from said source upon said anodes, an anode-cathode oscillation circuit, means including a capacitance in said oscillation circuit to determine the duration of discharges therein, means including a plurality of control electrodes associated with said anodes to initiate discharges periodically in said oscillation circuit, and means including an inductance connected in said direct-current circuit to charge said capacitance after each discharge in said oscillation circuit.

2. In a light modulation system comprising an alternating current source, an electric vapor lamp including a cathode and a plurality of anodes, means to impress alternating potentials from said source upon said anodes, and a direct-current anode-cathode circuit including said means, an anode-cathode oscillation circuit provided with means including an inductance and a capacitance for determining the duration of discharges in said oscillation circuit and a plurality of blocking condensers each connecting said frequency determining means and a different one of said anodes, means including a plurality of control electrodes each associated with a different one of said anodes to initiate discharges periodically in said oscillation circuit, and means including a choke coil connected in said direct-current circuit to charge said capacitance after each discharge in said oscillation circuit.

3. In a light modulation system comprising an alternating current source, an electric vapor lamp including a plurality of anodes and a cathode, circuit connections between said cathode and anodes and said source, means including said source and said circuit connections to cause a flow of current between said cathode and each of said anodes in succession, an anode-cathode oscillation circuit including means to determine the duration of discharges therein, said circuit connections including means to impress a voltage on said second-named means after each discharge in said circuit, and means to initiate discharges in said oscillation circuit including a plurality of control electrodes each associated with a different one of said anodes and a circuit tuned to a predetermined modulation frequency coupling said control electrodes to said oscillation circuit.

4. In a light modulation system comprising an alternating current source, an electric vapor lamp including a cathode and a plurality of anodes, circuit connections between said cathode and anodes and said source, means including said source and said circuit connections to cause a flow of current between said cathode and each of said anodes in succession, an anode-cathode oscillation circuit including means to determine the duration of discharges therein, said circuit connections including means to impress a voltage on said second-named means after each discharge in said circuit, a plurality of control electrodes each associated with a different one of said anodes, a circuit tuned to a predetermined modulation frequency and coupled to said oscillation circuit, and means including a flux-conducting element composed of material having high permeability and having a narrow flux-conducting portion to couple said control electrodes to said tuned circuit.

5. In a light modulation system comprising an alternating current source, an electric vapor lamp including a cathode and a plurality of anodes, circuit connections between said cathode and anodes, and said source, means including said source and said circuit connections to cause a flow of current between said cathode and each of said anodes in succession, an anode-cathode oscillation circuit provided with means including an inductance and a capacitance for determining the duration of discharge in said oscillation circuit and a plurality of blocking condensers each connecting said frequency determining means and a different one of said anodes, a plurality of control electrodes each associated with a different one of said anodes, a circuit tuned to a predetermined modulation frequency and coupled to said oscillation circuit, means including a flux-conducting element having high permeability and having a narrow flux-conducting portion to couple said control electrodes to said tuned circuit, and an inductance connected in said direct-current circuit to charge said capacitance after each discharge in said oscillation circuit.

6. In a light modulation system comprising an alternating current source, a plurality of electric vapor lamps arranged to operate in parallel and each including a cathode and a plurality of anodes and control electrodes, and means to impress alternating potentials from said source upon said anodes, a plurality of oscillation circuits each including the cathode and anodes of a different one of said lamps and including means for determining the duration of periodic discharges in said circuits, said first-named means including means to impress a voltage on said second-named means after each discharge in said oscillation circuits, and means including a circuit tuned to a predetermined modulation frequency and coupled to one of said oscillation circuits and to said control electrodes to initiate oscillations in all of said oscillation circuits and to maintain the oscillations in all of said oscillation circuits in phase.

7. In a light modulation system comprising an alternating current source, a plurality of electric vapor lamps arranged to operate in parallel and each including a cathode and a plurality of anodes and control electrodes, and means to impress alternating potentials from said source upon said anodes, a plurality of oscillation circuits each including the cathode and anodes of a different one of said lamps and including means for determining the duration of periodic discharges in said circuit, said first-named means including means to impress a voltage on said second-named means after each discharge in said oscillation circuits, means including a circuit tuned to a predetermined modulation frequency and coupled to one of said oscillation circuits to initiate oscillations in all of said oscillation circuits and to maintain the oscillations in all of said oscillation circuits in phase, and a plurality of coupling means each coupling the control electrodes of a different one of said lamps to said tuned circuit.

8. In a light modulation system comprising an alternating current source, a plurality of electric vapor lamps arranged to operate in parallel and each including a cathode and a plurality of anodes and control electrodes, and means to impress alternating potentials from said source upon said anodes, a plurality of oscillation circuits each including the cathode and anodes of a different one of said lamps and including means for determining the duration of periodic discharges in said circuits, said first-named means including means to impress a voltage on said second-named means after each discharge in said oscillation circuits, means including a circuit tuned to a predetermined modulation frequency and coupled to one of said oscillation circuits to initiate oscillations in all of said oscillation circuits and to maintain the oscillations in all of said oscillation circuits in phase, and a plurality of coupling means each including a plurality of flux-conducting elements having high permeability and each having a restricted flux-conducting portion, each of said coupling means coupling the control electrodes of a different one of said lamps to said tuned circuit.

9. In a light modulation system comprising an alternating current source, two electric vapor lamps arranged to operate in parallel and each including a cathode and a plurality of anodes and control electrodes, and means to impress alternating potentials from said source upon said anodes, two oscillation circuits each including the cathode and anodes of a different one of said lamps and each including means for determining the duration of periodic discharges in said circuits, said first-named means including means to impress a voltage on said second-named means after each discharge in said oscillation circuit, means to initiate oscillations in one of said oscillation circuits including a circuit tuned to a predetermined modulaton frequency coupled to said one of said oscillation circuits and coupled to the control electrodes associated with the anodes included in said one of said oscillation circuits by means including a flux-conducting element having high permeability and having a restricted flux-conducting portion, and means including a second flux-conducting element having high permeability and having a restricted flux-conducting portion to couple said tuned circuit to the control electrodes associated with the anodes included in the other of said oscillation circuits, whereby oscillations are initiated in said other of said oscillation circuits in phase with the oscillations in said one of said oscillation circuits.

10. In a light modulation system comprising an alternating current source, a plurality of electric vapor lamps arranged to operate in parallel and each including a cathode and a plurlity of anodes and control electrodes, and means to impress alternating potentials from said source upon said anodes, a plurality of oscillation circuits each including the cathode and anodes of a different one of said lamps and each including a capacitance and an inductance for determining the duration of periodic discharges in said oscillation circuits, said first-named means including means to charge said capacitances after each discharge in said oscillation circuits, means to initiate oscillations in one of said oscillation circuits including a circuit tuned to a predetermined modulation frequency coupled to one of said oscillation circuits and coupled to the control electrodes associated with the anodes included in said one of said oscillation circuits, and means including said inductance to couple said one of said oscillation circuits to the control electrodes associated with the anodes of others of said oscillation circuits to impress potentials upon said last-named control electrodes in synchronism with the potentials transmitted by said tuned circuit, whereby oscillations are initiated in said other oscillation circuits in phase with the oscillations in said one of said oscillation circuits.

11. In a light modulation system comprising an alternating current source, two electric vapor lamps arranged to operate in parallel and each including a cathode and a plurality of anodes and control electrodes, and means to impress alternating potentials from said source upon said anodes, two oscillation circuits each including the cathode and anodes of a different one of said lamps and each including a capacitance and an inductance for determining the duration of periodic discharges in said oscillation circuits, said first-named means including means to charge said capacitances after each discharge in said oscillation circuits, means to initiate oscillations in one of said oscillation circuits including a circuit tuned to a predetermined modulation frequency coupled to said one of said oscillation circuits and coupled to the control electrodes associated with the anodes included in said one of said oscillation circuits by means including a flux-conducting element having high permeability and having a restricted flux-conducting portion, and means including said inductance to couple said one of said oscillation circuits to the control electrodes associated with the anodes of the other of said oscillation circuits to impress potentials upon said last-named control electrodes in synchronism with the potentials transmitted by said tuned circuit, whereby oscillations are initiated in said other oscillation circuit in phase with the oscillations in said one of said oscillation circuits.

12. In a light modulation system, an alternating current source, an electric vapor lamp including a cathode, anode and control electrode, circuit connections between said cathode and anode and said source, means including said source and said circuit connections to cause a flow of current between said anode and said cathode, an oscillation circuit including said anode and cathode and including means to determine the duration of discharges in said circuit, said circuit connections including means to impress a voltage on said second-named means after each discharge in said circuit, and means including said control electrode to initiate discharges periodically in said oscillation circuit.

13. A light modulation system comprising an alternating current source, an electric vapor lamp including a cathode and an anode, circuit connections between said cathode and anode and said source, means including said source and said circuit connections to cause a flow of current between said anode and said cathode, an oscillation circuit including said anode and cathode, said oscillation circuit including an inductance and a capacitance to determine the duration of discharges in said oscillation circuit, said circuit connections including means to charge said capacitance after each discharge in said second circuit, and means including a control element associated with said anode to initiate discharges periodically in said oscillation circuit.

14. In a light modulation system comprising an alternating current source, an electric vapor lamp including a plurality of anodes and a cathode, circuit connections between said cathode and anodes and said source, means including said source and said circuit connections to cause a flow of current between said cathode and each of said anodes in succession, an anode-cathode oscillation circuit including inductance and capacitance to determine the duration of periodic discharges in said oscillation circuit, said circut connections including means to charge said capacitance after each discharge in said oscillation circuit, and means including a plurality of control electrodes associated with said anodes to initiate discharges at predetermined periods in said oscillation circuit.

15. In a light modulation system comprising an alternating current source, an electric vapor lamp including a plurality of anodes and a cathode, circuit connections between said cathode and anodes and said source, means including said source and said circuit connections to cause a flow of current between said cathode and each of said anodes in succession, an anode-cathode oscillation circuit including means to determine the duration of discharges in said oscillation circuit, said circuit connections including means to impress a voltage on said second-named means after each discharge in said circuit, and means to initiate discharges in said oscillation circuit including a plurality of control electrodes each associated with a different one of said anodes, and a circuit tuned to a predetermined frequency, said tuned circuit being coupled to said oscillation circuit and to said control electrodes.

16. In a light modulation system comprising an electric vapor lamp and an alternating current source to supply electrical energy to said lamp, means to convert into radiant energy in said lamp substantially all of said electrical energy supplied thereto from said source, said means comprising current rectifying means including said lamp to convert the alternating current supplied to said lamp into direct current, said first-named means further comprising direct current modulating means including said lamp to modulate the light emitted by said lamp.

17. In a light modulation system comprising an electric vapor lamp and an alternating current source to supply electrical energy to said lamp, means to convert into radiant energy in said lamp substantially all of said electrical energy supplied thereto from said source, said means comprising current rectifying means including said lamp to convert the alternating current supplied to said lamp into direct current, said first-named means further comprising direct current modulation means including said lamp to cause modulation at a predetermined frequency of the light emitted by said lamp.

18. In a light modulation system comprising an electric vapor lamp and an alternating current source to supply electrical energy to said lamp, means to convert into radiant energy in said lamp substantially all of said electrical energy supplied thereto from said source, said means comprising current rectifying means including said lamp to convert the alternating current supplied to said lamp into direct current, said first-named means further comprising means including said lamp to modulate at a predetermined frequency and to a predetermined degree said direct current, thereby to modulate correspondingly the light emitted by said lamp.

19. In a light modulation system comprising an alternating current source, an electric vapor lamp including a plurality of anodes and a cathode, circuit connections between said cathode and anodes and said source, means including said source and said circuit connections to cause a flow of unidirectional current between said cathode and said anodes in succession, an oscillation circuit including said anodes and cathode, said oscillation circuit including inductance and capacitance to determine the duration of periodic discharges therein, said circuit connections including an inductance to charge said capacitance after each discharge in said circuit, and means including a plurality of control electrodes associated with said anodes to initiate discharges at predetermined periods in said oscillation circuit.

20. In a light modulation system comprising an alternating current source, an electric vapor lamp including a plurality of anodes and a cathode, circuit connections between said cathode and anodes and said source, means including said source and said circuit connections to cause a flow of uni-directional current between said cathode and said anodes in succession, an oscillation circuit including said cathode and anodes, said oscillation circuit including means to determine the duration of discharge therein, said current connections including an inductance to impress a voltage on said second-named means after each discharge in said oscillation circuit, and means to initiate discharges in said oscillation circuit including a plurality of control electrodes each associated with a different one of said anodes and a circuit tuned to a predetermined modulation frequency, said tuned circuit being coupled to said oscillation circuit and to said control electrodes.

21. In a light modulation system including an electric vapor device and a source of alternating current, the method of operation which includes supplying alternating current to said device from said source, converting into radiant energy in said device substantially all of the electrical energy supplied to the device from said source, rectifying in said device the alternating current supplied thereto from the source, and modulating in said device at a predetermined frequency the resulting direct current, thereby to modulate correspondingly the light emitted by said device.

WILLEM F. WESTENDORP.